June 9, 1953  R. L. JAESCHKE  2,641,736
GENERATOR CONTROLLED MOTOR SYSTEM
Filed May 7, 1951  2 Sheets-Sheet 1

Ralph L. Jaeschke,
Inventor,
Koenig and Pope,
Attorneys.

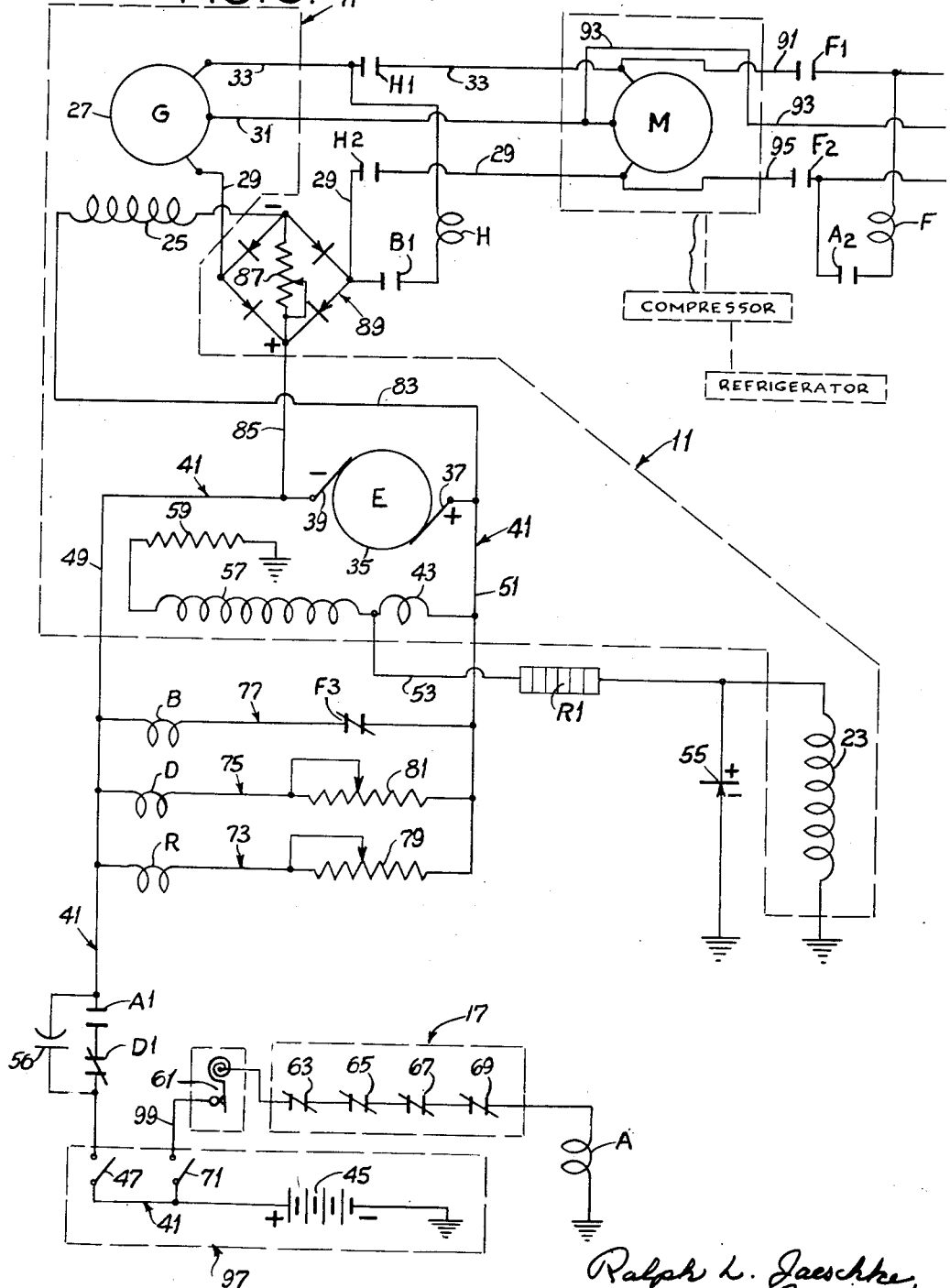

Patented June 9, 1953

2,641,736

UNITED STATES PATENT OFFICE 2,641,736

GENERATOR CONTROLLED MOTOR SYSTEM

Ralph L. Jaeschke, Kenosha, Wis., assignor to Dynamatic Corporation, Kenosha, Wis., a corporation of Delaware Application May 7, 1951, Serial No. 224,877

18 Claims. (Cl. 318—148)

This invention relates to control apparatus for electrically-controlled slip couplings, to generating apparatus for variable speed prime movers and to refrigeration systems for vehicles.

With the advent of frozen foods and other expensive refrigerated loads transported by trucks or other prime-mover-driven vehicles, vehicle refrigeration systems heretofore employed have proved to be inadequate from the standpoint of reliability. One of the objects of this invention is the provision of a highly reliable, yet economical, refrigeration system for a prime-mover-driven vehicle. Briefly, my refrigeration system comprises a hermetically-sealed motor-compressor unit forming a part of a mechanical refrigeration apparatus. The motor of this unit is supplied from a generator driven by the prime mover of the vehicle through an electrically-controlled slip coupling or clutch. The coupling is controlled in accordance with refrigeration requirements so that the prime mover is loaded by the refrigeration system only when refrigeration is required, and the coupling is controlled in accordance with the characteristics of the compressor motor so that the generator output provides for efficient motor operation. A high degree of reliability is achieved by the use of a hermetically-sealed motor-compressor unit and by the use of the vehicle prime mover as an original power source. Stand-by operation from a conventional external power supply is also provided for. Moreover, the division of the system into a motor-compressor unit and generating unit connected only by wires affords definite advantages of location which are especially important in tractor-trailer truck combinations.

Although the description herein is specifically directed to a refrigeration system for vehicles, certain aspects of the invention encompass generating apparatus broadly, particularly A. C. generating apparatus driven from a prime mover subject to wide speed variation and adapted to supply an A. C. load device of predetermined rated frequency, such as an A. C. motor. Briefly, the generating system comprises an electric slip coupling through which a generator is driven by the prime mover, the coupling being adapted to limit the maximum speed and output frequency of the generator and other control elements being adapted to disconnect the generator from the load at an abnormally low speed of the generator.

The control aspect of the invention features the use of a pilot generator or exciter to provide primary field excitation for the main generator, primary field excitation for the coupling, and a signal for speed control purposes. Speed regulation is accomplished by means of an inexpensive voltage or current regulator, and initial field excitation of the coupling is conveniently obtained from the usual battery or electric system of the vehicle. The main generator is protected against underspeed and overspeed operation. Other features to be noted are high starting torque of the motor provided by automatic increase of the main generator output and a pilot generator output which is unresponsive to the variations of the coupling field excitation. It will be understood that the control incorporates novel features of general utility as well as features having particular application in vehicle refrigeration systems. Other features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which one of various possible embodiments of the invention is illustrated, Fig. 1 is a diagrammatic representation of a tractor-trailer truck illustrating representative locations of parts of the apparatus of this invention;

Fig. 3 is a circuit diagram of the electric control;

Similar reference characters indicate corresponding parts throughout the several views of the drawings.

Figure 1:
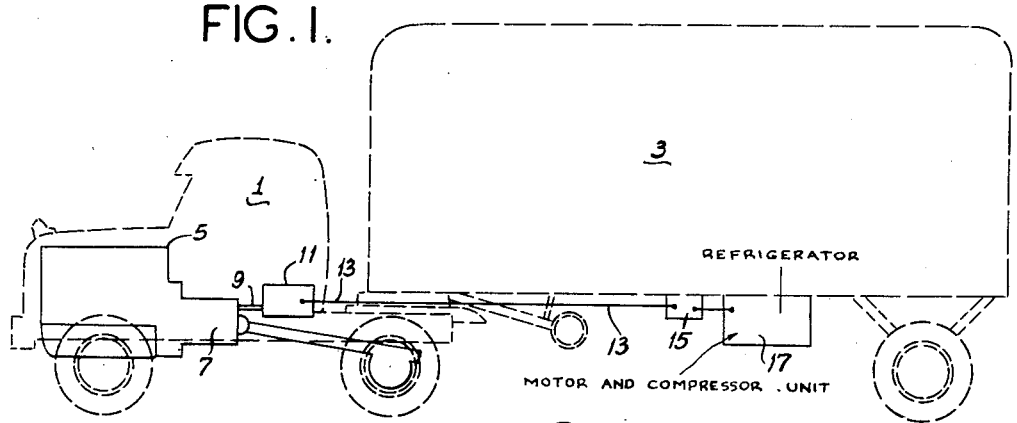

Referring to Fig. 1 of the drawings, there is shown in dotted lines a tractor 1 and a trailer 3. The trailer 3 serves as a refrigeration compartment. The tractor 1 has an engine or prime mover 5 coupled to its rear wheels through a transmission 7 to provide motive power. Extending from the transmission is a power take-off 9. An assembly 11 of certain generating apparatus is driven from the power take-off. This generating apparatus is electrically connected as indicated at 13 through a control unit 15 to a hermetically-sealed motor-compressor unit 17 forming a part of refrigerating apparatus for refrigerating the trailer 3. Details of the refrigerating apparatus are not shown, it being understood that any conventional type of mechanical refrigerating unit may be employed. The refrigerator component of the refrigerating apparatus is labeled "Refrigerator" in Fig. 1.

Figure 2:
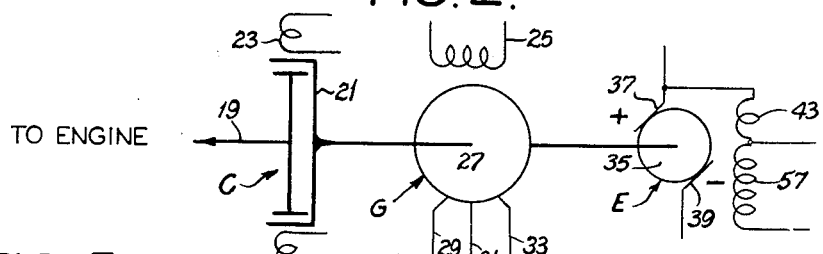
Fig. 2 is a diagrammatic representation of an assembly of certain generating apparatus.

The generating apparatus 11, as diagrammatically shown in Fig. 2, comprises an electrically-controlled clutch C, such as an eddy-current slip coupling, having a driving member 19 mechanically coupled to the power take-off 9 so as to be driven by the engine 5 and a driven member 21 mechanically coupled to drive a main generator G. A pilot generator or exciter E is also coupled to the driven member 21. Eddy-current slip couplings are known in the art, being shown, for example, in United States Patent No. 2,452,820, issued November 2, 1948, to Martin P. Wither. Briefly, such a coupling comprises a lightweight, relatively continuous inductor member, such as the driving member 19 shown in Fig. 2, and a heavier relatively interrupted field member, such as the driven member 21, which carries a field coil 23. The torque transmitted by the coupling varies with the slip between the driving and driven members and with the excitation of the field coil 23.

The main generator G supplies electric power to a motor M (Fig. 3) of the hermetically-sealed motor-compressor refrigeration unit 17. Hermetically-sealed motor-compressor units are known in the art, and are highly reliable, one of the reasons for high reliability being that there are no outside seals against rotating parts. The characteristics of the motor M are determined by the type of electric power generally available for stand-by operation. For example, the motor may be a 220 volt, 60-cycle, three-phase induction motor. It then follows that the main generator G should be a three-phase synchronous generator or alternator designed to provide 220 volts at 60 cycles under normal conditions of operation, and that the slip-coupling is controlled to drive the generator G primarily at the particular speed that results in the desired 220 volt, 60 cycle generator output. The exciter E is a small D. C. generator of the type normally mounted upon an alternator to provide the exciting current for the alternator field.

As shown, the alternator has a D. C. field coil 25 and a three-phase stator winding 27 connected with output conductors 29, 31 and 33. These conductors are connected to the motor M through certain control equipment to be described. The exciter E has an armature winding (not shown) connected to a commutator 35, which cooperates with brushes 37 and 39, brush 37 being positive with respect to brush 39 when the generating assembly is rotating. The power take-off 9 should be on the engine side of the reversing gear of the transmission 7 to avoid troubles from reversing.

The purpose of the coupling is twofold, one object being to uncouple the generating apparatus when refrigeration is not required, and the other object being to hold the speed of the main generator G within limits despite considerable speed variation of the engine (prime mover) of the truck during operation of the truck. The control unit 15 automatically provides for these objects and has certain other features of operation that will be made apparent.

Referring to Fig. 3, the control is shown to comprise a clutch energizing circuit generally designated 41 having in series with the field coil 23 of the coupling, a variable resistance R1 of a current regulator, a series field coil 43 of the exciter E, the brushes 37 and 39 of the exciter E and a D. C. power supply 45, which may be the battery of the truck's electric system. It will be noted that the battery 45 and the exciter E are connected so that their respective polarities supplement one another. An ignition switch 47, a normally-closed relay switch D1 and a normally-open relay switch A1 are series connected between the positive terminal of the battery 45 and a conductor 49 which leads to the negative brush 39 of the exciter. The series field coil 43 of the exciter is connected at 51 to the positive brush 37; and a connection 53 is made from the series field coil 43 to the current regulator element R1. The circuit is completed from the clutch field coil 23 to the negative terminal of the battery 45 by ground connections as indicated. It will be understood that the circuit of Fig. 3 illustrates connections for a negative ground electric system of a vehicle, but that the circuit may be readily adapted for positive ground vehicle electric systems.

Protection against inductive discharge of the clutch field coil 23 is provided by a rectifier 55, such as a selenium rectifier, connected across the coil 23 to oppose flow of normal exciting current and by-pass the inductive discharge. Also, the switches A1 and D2 are protected against arcing from inductive discharge in the clutch energizing circuit 41 by a capacitor 56 shunted across these switches.

Returning to the exciter E, in addition to the series field coil 43, the exciter includes a shunt field coil 57 so that the exciter is in part a self-excited long-shunt compound generator with respect to the load of the clutch field coil 23. The shunt field coil 57 is grounded through a resistor 59, hence the exciter is not completely self-excited, but rather is partly excited by means of the battery 45. This arrangement insures that the exciter will build up voltage properly and additionally prevents reversal of polarity which might result from the series field coil 43. The series field coil 43 provides a degree of voltage regulation at the exciter E during variation of the current drawn by the clutch field coil 23 as determined by the current regulator element R1.

The normally-open switch A1 is actuated by a relay coil A connected in a circuit across the battery 45, which circuit includes series connected switches 61, 63, 65, 67, 69 and 71. Switch 61 is a thermostatic switch operated by a thermostat in the refrigerated compartment, as in trailer 3, and adapted to close when the temperature of the compartment exceeds a predetermined value. Switches 63 and 65 are normally-closed high and low pressure switches protecting the compressor, and the switches 67 and 69 are normally-closed overload protection switches for the motor M. The switch 71 provides for manual control of the refrigerating system. This switch is mounted upon the dashboard of the tractor so that the driver may exercise overriding control of the refrigeration.

Connected across the output of the exciter and between the conductors 49 and 51 are a speed regulating control circuit 73, an overspeed protection control circuit 75, and an underspeed protection control circuit 77. Circuit 73 controls the resistance element R1 of the current regulator and includes a coil R adapted to increase the resistance of the regulator element R1 with increasing current through coil R. This current or voltage regulator is an inexpensive device of the type conventionally employed in vehicle electric systems to regulate generator voltage. For example, R1 may be a normally compressed carbon pile, and the coil R would be adapted to reduce the compression on and increase the resistance of the carbon pile with increasing current through the coil. An adjustable resistor 79 is provided in the branch circuit 73 to vary the response of the current regulator to the voltage output of the exciter E.

The overspeed protection control circuit 75 includes a relay coil D and an adjustable resistor 81 for varying the response of the relay to the voltage output of the exciter. Relay coil D operates the normally-closed relay switch D1 so as to deenergize the coupling when the speed of the driven member 21 exceeds a predetermined value, as upon failure of the regulator R and R1.

The exciter E has, in addition to its functions of supplying a principal part of the exciting current for the clutch field coil 23 and of providing a speed-responsive signal for speed regulating purposes, the function of providing a primary part of the exciting current for the alternator field coil 25. Moreover, provision is made for temporarily increasing the field excitation of the alternator under motor-starting conditions without adversely affecting other control actions.

A conductor 83 connects the positive exciter brush 37 with one terminal of the alternator field coil 25 and a conductor 85 leading from the negative exciter brush 39 is connected to a small resistor or impedance 87. The resistor 87 in turn is connected to the other terminal of the field coil 25. Connected across this resistor 87 is a bridge rectifier 89 which provides a D. C. voltage supplementing the output of the exciter. The A. C. input terminals of the bridge rectifier are series connected in the output conductor 29 of the alternator G so that the D. C. voltage impressed across the resistor 87 is proportional to the current drawn by the motor M. The unbalancing effect of the rectifier 89 upon motor operation is not severe, and the efficiency of the motor is only slightly decreased.

The output conductor 29, after leaving the bridge rectifier 89, is connected to the motor M through a normally-open relay switch H2. A similar switch H1 interrupts the generator-to-motor conductor 33, these two switches being effective to disconnect the motor from the generator G. Connected across conductors 29 and 33 on the generator side of switches H1 and H2 is a circuit including a normally-open relay switch B1 and a relay coil H for actuating switches H1 and H2. Switch B1 is under the control of a relay coil B in the underspeed protection control circuit 77 connected across the exciter E. The purpose of these relay switches B1, H1 and H2 is one of automatically connecting the main generator G to the motor M after the generator output is sufficient in terms of frequency and voltage properly to operate the motor. In other words, the motor is protected against operation when the speed of the generating apparatus is abnormally low.

Relay switch B1 is in effect responsive to the speed and thereby the output frequency of the alternator inasmuch as the output of the exciter is a function of speed. Relay switches H1 and H2 might be considered as responsive to the voltage developed by the alternator G. Therefore, double protection is afforded, although it will be understood that switches H1 and H2 might be replaced by switches actuated directly by the relay coil B or that the circuit 77 and switch B1 might not be used.

Energization of motor M from an external power supply, in this example, a three-phase, 60-cycle, 220 volt supply, is accomplished by means of lines 91, 93 and 95 connected to the motor. Two of the lines, 91 and 95, are interrupted by normally-open relay switches F1 and F2, respectively. Connected across these lines 91 and 95 on the power supply side of the switches F1 and F2 is a circuit including a normally-open relay switch A2 and a relay coil F for actuating switches F1 and F2. A normally-closed relay switch F3 actuated by coil F is provided in the underspeed protection control circuit 77. Switch F3 is adapted automatically to effect disconnection of the alternator G from the motor M when the motor is connected to an external power source. Switch A2 is actuated by the relay coil A and serves the same purpose as switch A1. It will be understood that the lines 91, 93 and 95 are sufficiently long to facilitate connection with an external power supply source, a suitable plug (not shown) being provided for this purpose. When not in use, the lines would be stored on the trailer.

The control circuit may be physically arranged to provide for separation, as by plugs, of the generating apparatus 11 from the control 15 and of the control from the motor compressor unit 17, as along the dotted lines of Fig. 3. This feature is desirable in tractor-trailer trucks, because the tractor may be physically separated from the trailer. The switches 47 and 71 and the battery 45 would necessarily be located on the tractor 1, hence may be separated from the control as indicated by box 97. Thermostatic switch 61 would of course be located in the trailer 3, hence a conductor 99 and ground connections would lead from the tractor to the trailer.

Operation is as follows:

With the ignition switch 47 closed for operation of engine 5, and with the manual control switch 71 closed, the apparatus is conditioned for operation in accordance with the need for refrigeration as determined by the thermostatic switch 61. The driving member 19 of the coupling C rotates at a speed determined by the engine speed. Initially, the driven member 21 of the coupling is stationary, prior to closure of switch 61.

Closure of the thermostatic switch 61 results in energization of the coil A and closure of the relay switch A1. This completes the clutch energizing circuit 41 so that the field coil 23 of the coupling is initially excited by the battery 45. No power is supplied at this time by the exciter E, which is stationary. The low voltage battery excitation of the coupling field coil 23, therefore provides a smooth low-torque pick-up at the coupling. The current regulator element R1 initially offers a low nominal resistance.

Figure 4:
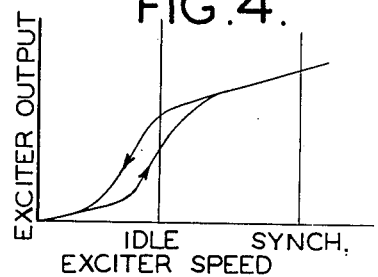
Fig. 4 is a plot of the output voltage of the exciter as a function of its speed.

As torque is transmitted by the coupling, the exciter E and the main generator G begin to rotate. As this occurs the exciter develops a voltage which supplements the battery voltage. As illustrated in Fig. 4, the voltage build up of the D. C. exciter is relatively sharp at a critical speed which depends upon the self-excitation characteristics of the exciter. Because of hysteresis, this voltage change depends upon whether there is build up or a falling off in exciter speed. The voltage build up preferably occurs at critical speed corresponding generally to the engine idling speed (for example, 500 R. P. M.) to permit operation at low engine speeds. Thus, when the engine is operating slightly above idle speed, there is a substantial excitation of the coupling. The exciter voltage rises somewhat further with speed increase to a maximum value, for example 18 volts, at synchronous speed.

The exciter output of 18 volts added to the six volts of the battery will result in a net coupling excitation of 24 volts, this excitation being, for example, the normal full excitation for minimum coupling slip and high efficiency. Although the net coupling excitation will decrease somewhat as the exciter speed or engine speed falls below the synchronous speed, the coupling will still be substantially fully excited because of the critical voltage-speed characteristic of the exciter. The exciter output does not drop appreciably until the engine is slowed to idling speed.

The build up of the exciter voltage also has certain other effects, among which is excitation of the field coil 25 of the main generator G. The partially excited synchronous generator G driven by the coupling C therefore develops a voltage across its output conductors 29, 31 and 33. The frequency and voltage of the generator G will vary with its speed, the desired 220 volt, 60-cycle output being reached at synchronous speed.

Initially, the main generator G is electrically disconnected from the motor M at switches H1 and H2. As the exciter output builds up, a voltage is impressed across the underspeed control circuit 77, and when this voltage reaches a predetermined value, for example a voltage corresponding to an engine speed of 600 R. P. M., the coil B operates to close switch B1. If the voltage generated by the alternator is sufficient, coil H actuates switches H1 and H2 to connect the motor M to the main generator.

Figure 5:
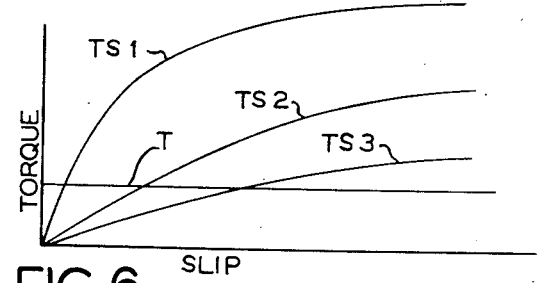
Fig. 5 is a plot of the torque transmitted by the coupling as a function of its slip for different values of field excitation; and, Fig. 6 shows plots CS and CE of the compressor speed and coupling excitation, respectively, as a function of prime mover or engine speed.

At first, a large starting current is drawn by the motor, but the main generator is adapted to supply this energy. The extra torque to drive the generator is readily supplied by the coupling at the cost of greater slip. In Fig. 5, curve TS1 represents the torque-slip characteristic for full excitation and line T indicates the normal torque. It is apparent that the torque may rise considerably with some increase in slip. This increase in slip, being temporary, is not objectionable. The increase in engine load is insignificant considering the comparatively large capacity of the engine 5.

Also, the output voltage of the alternator is maintained by providing a transient increase in its field excitation. The resistor 87 connected across the output of the bridge rectifier 89 has a low resistance such that during normal operation of the motor, the D. C. voltage supplied at resistor 85 is relatively low, for example, six volts. Under motor starting conditions, this voltage increases with increasing motor current, so that the excitation of field 23 of the alternator is increased, thereby maintaining the output voltage of the alternator. Upon completion of the starting cycle, the motor current and the net field excitation voltage return to normal values, the latter being for example 24 volts.

It will be apparent from curve CS of Fig. 6, that the compressor speed varies generally with the engine speed below a predetermined value, herein termed the synchronous speed; and the compressor speed is otherwise substantially constant. Various factors may be varied to cause speed reduction or increase between the compressor and engine 5, among which would be the speed ratio between the engine and the power take-off 9, the generator windings, the motor windings and the gear arrangement in the motor-compressor unit.

The choice of motor and generator windings is somewhat limited, but the overall speed change from engine to compressor can be readily chosen to fit the requirements of use. It will be appreciated that the clutch dissipates power in the form of heat when slipping under load, hence it is desirable to have the synchronous speed as high as practical. At the same time, the motor M cannot be efficiently operated when the generator output is low in frequency or voltage. Therefore, the synchronous speed is selected to fit the type of operation for which the truck is principally employed. A high synchronous speed is satisfactory for inter-city transportation where the truck spends a major portion of its time moving at high speeds. A low synchronous speed would be in order for a truck which operates within a city making deliveries every few minutes.

Figure 6:
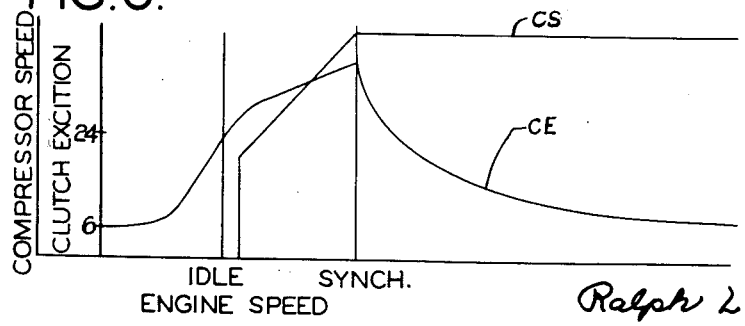

At synchronous speed, the current regulator R1 becomes effective to reduce the field excitation for the coupling and hold the driven speed substantially constant as indicated by curve CS in Fig. 6. The voltage drop across the current regulator element increases and the net clutch excitation voltage drops as indicated by curve CE of Fig. 6. As the clutch excitation is reduced, the torque-slip characteristic of the coupling is changed so that greater slip is required to transmit the same torque. This relation is illustrated by curves TS-2 and TS-3 of Fig. 5 for progressively smaller field excitations. In this manner, the speed of the generating apparatus is regulated. The response of the current regulator to a predetermined exciter voltage is rather sharp so that the driven speed is closely regulated above synchronous speed.

In the case of a two horsepower compressor having a maximum running torque of 17 pound-feet, a synchronous engine speed of 1200 R. P. M. would result in a loss of three horsepower at an engine speed of 3000 R. P. M. This loss may be dissipated by an air-cooled eddy-current coupling. When the engine is operating from a speed slightly above idling, for example 600 R. P. M. to a speed of 1200 R. P. M., the coupling would be substantially fully excited and the alternator output would vary in frequency approximately from 30 to 60 C. P. S. with variations in the engine speed. There would be consequent variation in the speed of the compressor motor, but the refrigeration supplied at half maximum capacity could be made sufficient for most refrigeration conditions in order to have effective refrigeration at low engine speeds.

Therefore, the losses below synchronous speed are largely the result of operating the electrical equipment at subnormal speeds. Above synchronous speed, the losses are in the coupling. The resulting balance provides for a practical refrigeration system. While the plots of Figs. 4–6 are illustrative of these relations, it will be understood these plots are merely representative and diagrammatic.

During loading of the truck or upon breakdown, stand-by operation is readily obtained by connecting the conductors 91, 93 and 95 to a conventional 60-cycle, 220 volt power supply. In such an event, the relay coil F is energized, provided the manual control dash switch 71 is closed so that switch A2 is closed. Relay coil F causes the switches F1 and F2 to close to connect the compressor motor to the external power supply and causes switch F3 to open to effect disconnection of the motor from the generator at relay switches H1 and H2.

An additional feature to be noted is the regulating effect of the system upon the output voltage of the exciter E. It is important that the voltage from the exciter remain stable for a given value of speed when the current demand from the exciter is changed. Small D. C. exciters of themselves have relatively poor voltage regulation characteristics. In this system, improved voltage regulation is obtained by providing the series field connection for the exciter with respect to the load of the coupling field coil.

In conclusion, my refrigeration system for a vehicle features the provision of a motor-driven compressor and a generator intermittently driven in accordance with the need of refrigeration through an electrically-controlled clutch. Principal among the advantages of this system are to be noted: the reliability and economy afforded by the hermetically-sealed motor-compressor unit and by the use of the main engine as an original power source for operating the refrigeration apparatus; the flexibility afforded by a division of the system into a mechanically driven power unit 11 and a refrigeration unit 17 with only electrical connections between the units; and, the provision for stand-by operation.

In addition to the above, this system is adapted for any type of intermittently operated load driven from the prime mover of a prime-mover-driven vehicle. In this connection, there will be noted: the division of the field excitation for the coupling into a component supplied from the battery of the vehicle for initially energizing the coupling and a comparatively larger or primary component supplied by a generator driven by the coupling; the economical speed regulation afforded by the inexpensive current regulator responsive to the output of the generator; the removal of undesired load from the engine; and, the smooth pick up of load provided by the control.

As to those features of the invention having application to motor-generator combinations, there will be noted: convenient speed regulation of a motor, particularly an A. C. motor, by slip regulation of a coupling driving the generator; operation of the motor for the most part under rated conditions of voltage and frequency during variation in the prime mover speed, especially where the motor is adapted for stand-by operation; high starting torque afforded by increased generator output when the motor is started; and, protection against operation of the motor at abnormally low voltages and frequencies.

Moreover, it will be noticed that the invention represents a novel approach to the problem of deriving electric power, particularly A. C. energy, from a power take-off of a prime mover subject to wide speed variation. In A. C. generating apparatus, variations in frequency as well as in voltage result from changes in the speed of the generator. Generally, A. C. load devices should not be operated with A. C. energy of abnormally low frequency relative to the rated frequency; and slip couplings should not be operated with excessive slip. In this system, the generator is electrically disconnected from the load at abnormally low engine speeds. At intermediate values of engine speed, the coupling is substantially fully excited and operates with nominal slip so that the load device is supplied with power of subnormal varying frequency, this being permissible within limits; and, at high engine speeds, the coupling is adapted to slip and thereby limit the output frequency and speed of the generator.

In this manner, A. C. energy suitable for operating an A. C. load device of predetermined rated frequency is conveniently obtained despite wide variation in the speed of the prime mover. At the same time, abnormally inefficient operation of the load device and excessive losses at the coupling are minimized. The particular values of engine speed at which the generator begins to supply power to the load and at which the coupling begins to slip will necessarily be determined from the overall nature of the system.

Other features of the generating system to be noticed are: economy of equipment and power afforded by the use of a pilot generator as an exciter for the main generator and coupling, and further the provision for independent variation of the field excitation of either the main generator or coupling; the provision for initially energizing the coupling when the pilot generator is driven by the coupling; protection against underspeed loading of the generator in terms of voltage and frequency; and, protection against overspeed operation.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. In combination, an A. C. motor normally adapted to be supplied with electrical power of a predetermined frequency, an A. C. generator supplying electrical power to said motor, an electrically-controlled slip coupling through which the generator is driven, said coupling having a field coil controlling its slip, said A. C. generator having a D. C. field coil, a D. C. generator driven by the coupling and connected to excite the field coils of the A. C. generator and coupling, and a current regulator responsive to the voltage of the D. C. generator connected between the D. C. generator and the field coil of the coupling, said current regulator being adapted to reduce the excitation of the field coil of the coupling when the speed of the main generator tends to exceed a value at which the frequency of the main generator output exceeds the predetermined frequency for which the A. C. motor is adapted normally to operate.

2. In combination, an A. C. motor, an A. C. generator adapted to supply electric power to said motor, said A. C. generator having a D. C. field coil, a D. C. exciting generator connected to excite the field coil of the main generator, an impedance series connected with the field coil of the main generator and with the exciting generator, a bridge rectifier having D. C. output terminals connected across said impedance and having A. C. input terminals series connected between the generator and the motor, thereby providing a D. C. voltage across said impedance proportional to the current drawn by the motor.

3. Generating apparatus comprising a generator adapted to supply electric power to a load, an electrically-controlled slip coupling through which the generator is driven, said coupling having a field coil controlling its slip, a pilot generator responsive to the speed of the main generator, a slip regulating control including a current regulator responsive to the voltage of said pilot generator adapted to vary the excitation of the coupling field coil, and an underspeed protection control including a relay responsive to the output voltage of the pilot generator adapted to disconnect the main generator from its load when the output of the pilot generator falls below a predetermined value.

4. Generating apparatus as set forth in claim 3 further including an overspeed protection control including a relay responsive to the voltage of the pilot generator adapted to deenergize the field coil of the coupling when the output of the pilot generator increases above a predetermined value.

5. Generating apparatus adapted to supply alternating current of predetermined frequency, comprising an A. C. generator having a field coil, an electrically-controlled slip coupling through which the A. C. generator is driven, said slip coupling having a field coil controlling its slip, a D. C. generator driven by the slip coupling, said D. C. generator being connected to excite the field coils of the A. C. generator and coupling, and a current regulator responsive to the speed of the A. C. generator connected in the exciting circuit for the field coil of the coupling, said current regulator being adjusted to reduce the excitation of the coupling when the speed of the A. C. generator tends to exceed a value at which the frequency of the generator output exceeds said predetermined frequency.

6. Generating apparatus comprising a synchronous generator, an electrically-controlled slip coupling through which the synchronous generator is driven, a field exciting circuit for the synchronous generator, a D. C. exciting generator connected in the field exciting circuit for the synchronous generator, said exciting generator being driven by the coupling, and a field exciting circuit for the coupling including said exciting generator.

7. Generating apparatus as set forth in claim 6 further including bridge rectifier means in an output conductor of the synchronous generator, said rectifier means feeding to a resistor in the field exciting circuit for the synchronous generator.

8. Generating apparatus as set forth in claim 6, further including relay switches connected in the output conductors of the synchronous generator, said relay switches being under the control of a relay connected across the exciting generator.

9. Generating apparatus as set forth in claim 6, further including relay switches connected in the output conductors of the synchronous generator, said relay switches being actuated by a relay coil connected across the output conductors of the synchronous generator on the generator side of the relay switches.

10. Generating apparatus as set forth in claim 6 further including a relay switch connected in the field exciting circuit for the coupling, said relay switch being actuated by a relay coil connected across the exciting generator.

11. Generating apparatus comprising a generator adapted to supply electric power to a load, an electrically controlled slip coupling through which the generator is driven, said coupling having a field coil controlling its slip, a slip regulating control including speed-responsive means for varying the field excitation of the field coil of the coupling, an underspeed-protection control including switch means responsive to the generator speed adapted to disconnect the generator from its load when the speed of the generator falls below a predetermined value, and an overspeed-protection control including switch means responsive to the generator speed adapted to deenergize the field coil of the coupling when the speed of the generator is increased above a predetermined value.

12. In combination, a battery, an A. C. motor, an A. C. generator supplying electrical power to said motor, an electrically controlled slip coupling through which the generator is driven, said coupling having a field coil controlling its own slip, said A. C. generator having a D. C. field coil, a D. C. exciter for the field coil of the A. C. generator and having its own D. C. field coil, said exciter being also driven by the coupling and connected to excite its own field coil and the field coil of the coupling, a regulator connected to the field coil of the coupling, a circuit serially connecting the battery and the D. C. exciter with the field of said D. C. exciter, said circuit also serially connecting the exciter and the field coil of the coupling through said regulator, whereby the voltage of the battery alone may be applied to the fields of the D. C. exciter and slip coupling before the exciter rotates, and whereby the voltage of the exciter when rotating may be additionally applied to its own D. C. field coil and to the field coil of the slip coupling.

13. Apparatus made according to claim 12, wherein said circuit includes control means responsive to increasing voltage output of the exciter to adjust the regulator so as to control excitation of the field coil of the coupling.

14. Apparatus made according to claim 13, in which said circuit also includes means responsive to underspeed voltage output from the exciter to disconnect the A. C. generator from the A. C. motor.

15. Apparatus made according to claim 14, wherein said circuit also includes means responsive to overspeed voltage from the exciter to open said circuit.

16. Apparatus made according to claim 15, wherein there is an additional circuit including a thermostatic switch adapted in response to temperature decrease and increase respectively to open and close the battery and exciter circuit feeding said field coil.

17. Apparatus made according to claim 15, including means for connecting a standby A. C. voltage supply to the A. C. motor, and means responsive to the making of a connection to actuate said underspeed disconnecting means between the generator and motor.

18. Apparatus made according to claim 16, including means for connecting a standby substantially constant frequency A. C. voltage supply circuit to the A. C. motor, means responsive to the making of a connection to actuate said underspeed disconnecting means between the generator and the motor, and means in said additional thermostatic switch circuit responsive to action of the thermostatic switch to open said constant frequency standby supply circuit.

RALPH L. JAESCHKE.

References Cited in the file of this patent

UNITED STATES PATENTS

| Number | Name | Date |
|---|---|---|
| 704,574 | Pintsch | July 15, 1902 |
| 1,217,244 | Turbayne | Feb. 27, 1917 |
| 1,367,103 | Smith | Feb. 1, 1921 |
| 1,861,180 | Grob | May 31, 1932 |
| 2,025,487 | Winther | Dec. 24, 1935 |
| 2,089,512 | Upp | Aug. 10, 1937 |
| 2,094,141 | Zingg | Sept. 28, 1937 |
| 2,157,840 | Whiting et al. | May 8, 1939 |
| 2,170,546 | Candor et al. | Aug. 22, 1939 |
| 2,193,893 | Van Vleck | Mar. 19, 1940 |
| 2,357,201 | Hornbostle | Aug. 29, 1944 |